Feb. 14, 1961 J. W. THOMAS 2,971,998
THERMOCOUPLE LEAD ATTACHMENT
Filed Aug. 5, 1958 2 Sheets-Sheet 1
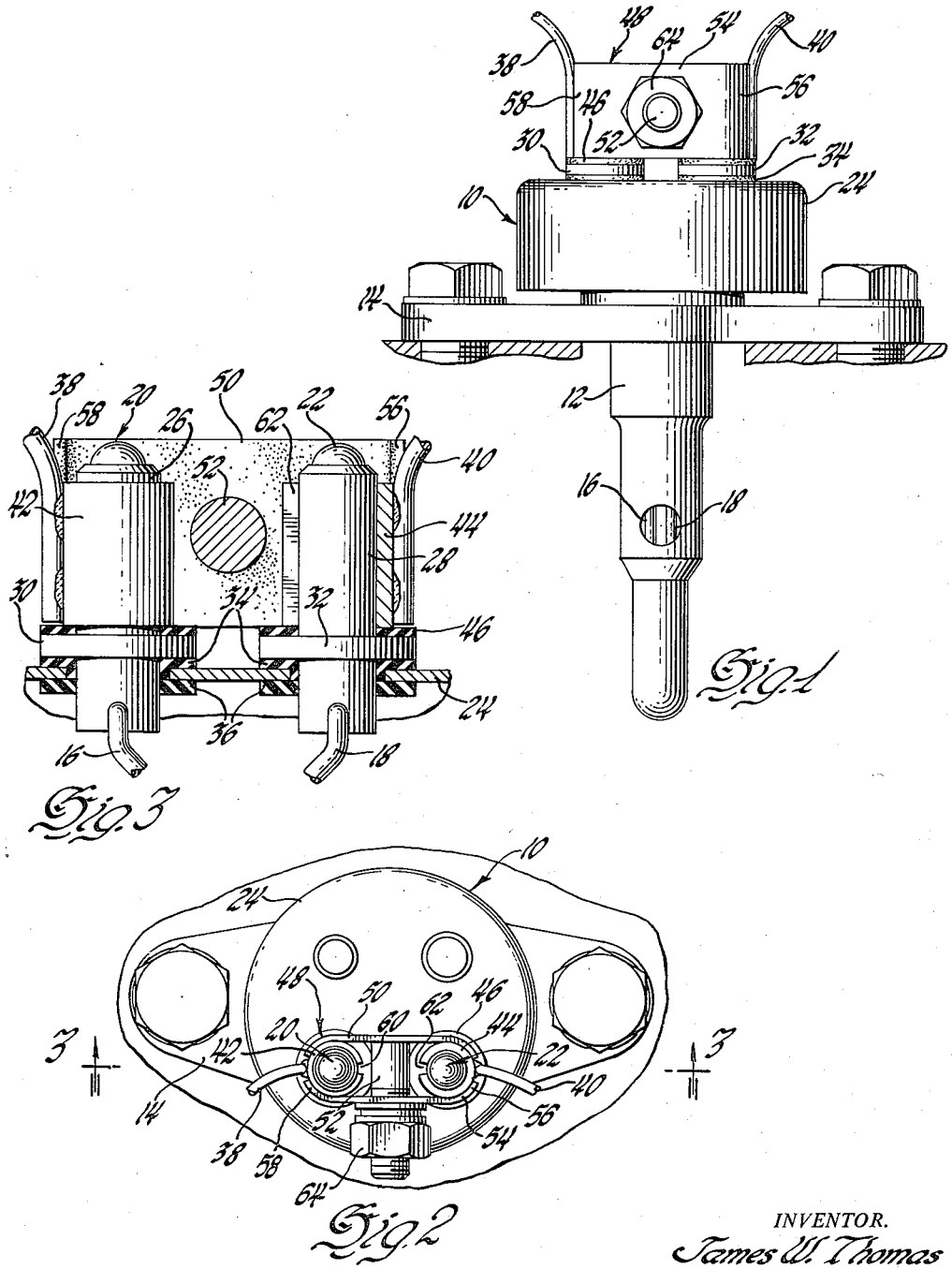
INVENTOR.
James W. Thomas
BY
R. H. Barnard
ATTORNEY Feb. 14, 1961 J. W. THOMAS 2,971,998
THERMOCOUPLE LEAD ATTACHMENT
Filed Aug. 5, 1958 2 Sheets-Sheet 2
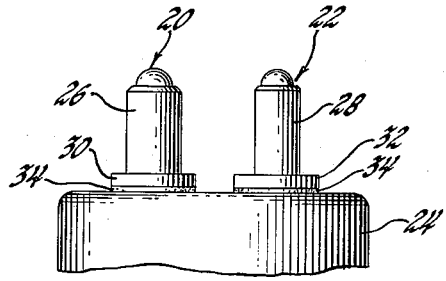
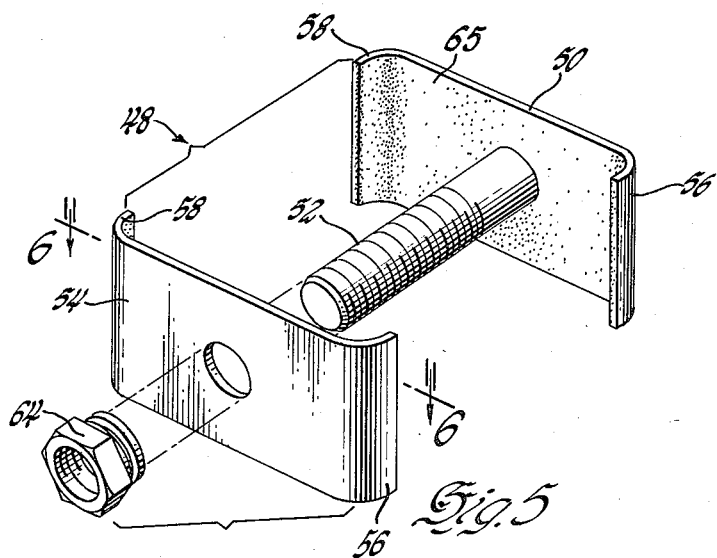
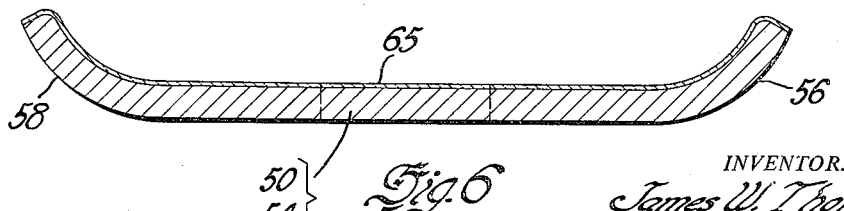
INVENTOR.
James W. Thomas
BY R. J. Barnard
ATTORNEY

United States Patent Office 2,971,998
Patented Feb. 14, 1961

2,971,998

THERMOCOUPLE LEAD ATTACHMENT

James W. Thomas, Indianapolis, Ind., assignor to General Motors Corporation, Detroit, Mich., a corporation of Delaware Filed Aug. 5, 1958, Ser. No. 753,319

2 Claims. (Cl. 136—4)

The present invention relates to improved means for attaching thermocouple lead wires to thermocouple studs. The present invention results in a thermocouple assembly in which the failures or rejections due to faulty connecting mechanisms are considerably reduced.

The present invention relates to thermocouples in which alloys such as those of aluminum-nickel and chromium-nickel are used in the thermo-electric circuit including the hot leads and connector studs. Particularly when used with jet engines, it is important that thermocouples accurately reflect engine temperatures. It is for this reason that such alloys are used since previous types of thermocouple materials have been found to have varying thermo-electric properties and have accordingly not provided the requisite accuracy under high temperature operating conditions.

However, while such alloy materials have provided the required accuracy in terms of temperature measurement they have created certain secondary problems related to mechanical strength and machinability. It has been the practice to thread the connector studs made of these alloys as part of the means for connecting the leads thereto. Such alloys are approximately 90 to 95% nickel. As a result studs made of these materials when threaded have extremely sensitive threads and any nick or blemish on the thread will produce galling with a resultant thermocouple rejection.

The present invention, therefore, provides a non-threaded means for connecting the thermocouple lead wires to connector studs in such a way as to provide a new and improved thermocouple assembly.

More specifically, in the present invention smooth studs are used and are adapted to receive split sleeve members to which leads are already connected. After assembling a pair of such sleeves on adjacent stud members a two part connector device is provided whereby the sleeves are clampingly engaged between a pair of relatively movable members and thereby securely attached to the thermocouple assembly.

Other objects and advantages of the present invention will be apparent from a perusal of the detailed description which follows.

In the drawings:

Figure 1 is an elevational view of a thermocouple embodying the subject invention;

Figure 2 is a plan view of the thermocouple assembly;

Figure 3 is a section on line 3—3 of Figure 2;

Figure 4 shows the connector studs mounted on the thermocouple casing;

Figure 5 is an exploded view in perspective of the clamp connection;

Figure 6 is an enlarged portion of the clamp taken on line 6—6 of Figure 5.

While the present invention may be utilized in any environment in which a thermocouple is used, it is particularly adapted for use with jet engines as noted. A thermocouple is indicated generally at 10 and includes a probe casing 12 adapted to be disposed within that portion of the engine in which it is desired to measure temperature. Probe casing 12 is suitably mounted upon a support plate 14 through which the entire thermocouple assembly is secured to the engine.

A pair of hot thermocouple wires 16 and 18 are disposed within probe casing 12 and connected at their inner end in the normal manner. The thermocouple wires are respectively formed of different materials, such as the suggested aluminum-nickel and chromium-nickel alloys, so that an E.M.F. differential proportional to temperature is created in the thermo-electric circuit.

The upper ends of thermocouple wires 16 and 18 are suitably connected respectively to studs 20 and 22 mounted upon a casing 24 as best seen in Figure 3. Studs 20 and 22 are formed of the same material as the hot lead attached thereto.

As best seen in Figure 4, studs 20 and 22 include smooth cylindrical shank portions 26 and 28 which have supporting flanges 30 and 32 intermediate their ends. In mounting the connector studs on casing 24, it is the practice to electrically insulate the studs from the casing by the interposition of insulating washers 34 and 36 between the studs and casing. The washers are normally formed of mica.

In order to provide a temperature reading it is necessary to provide thermocouple wires 38 and 40 leading from the thermocouple to a suitable measuring instrument, not shown, which will convert the E.M.F. differential between leads 16 and 18 into a direct temperature reading.

It is the means whereby the leads 38 and 40 are connected to thermocouple 10, and more specifically to studs 20 and 22, which is the basis of the present invention. For this purpose, a pair of split sleeves 42 and 44 are provided. Each of these sleeves is respectively formed of the suggested aluminum-nickel and chromium-nickel materials corresponding to that part of the thermo-electric circuit in which it is interposed. Cold leads 38 and 40 are suitably joined to sleeves 42 and 44, as by soldering, etc., prior to the assembly of the sleeves to the thermocouple.

Sleeves 42 and 44 are respectively mounted on studs 20 and 22. Here again for insulation purposes a mica washer 46 is mounted on each stud intermediate the sleeve and stud flange.

In order to retain the sleeves 42 and 44 upon studs 20 and 22, a clamping device indicated generally at 48 is provided. The clamping device includes a first member having a dish-shaped bracket 50 fixed to one end of a threaded stud member 52. A corresponding clamping member 54 is provided and is centrally apertured to permit the same to be movably mounted upon stud 52. It is to be noted that clamping members 50 and 54 include outwardly curved portions 56 and 58 having radii of curvature corresponding to that of the sleeves 42 and 44.

As best seen in Figure 2, sleeves 42 and 44 are mounted on studs 20 and 22 so that the slots 60 and 62 generally face each other.

To assemble, clamping member 50 is brought into contact with one side of the sleeves 42 and 44 so that stud member 52 projects therebetween. Subsequently, the other clamping member 54 is mounted on stud 52 in oppositely disposed relation to member 50 and retained thereon by suitable washers and a nut 64. Nut 64 may be drawn upon the stud 52 with sufficient force to assure a rigid clamping relationship between sleeves 42 and 44 and studs 20 and 22.

In order to maintain the requisite electrical insulation between the thermo-electric circuit and the remainder of the thermocouple structure, the dish-shaped members 50 and 54 are flame sprayed or ceramic coated as indicated at 65, in any well known manner.

The components of clamping device 48 may be made of any suitable material such as steel. Consequently, it is apparent that a good clamping fit and hence good electrical contact may be maintained between sleeves 42—44 and studs 20—22 without the clamping forces having to be maintained or achieved by stressing the thermo-electric materials which, as noted, have undesirable or impractical mechanical characteristics when employed directly for clamping or coupling purposes.

I claim:

1. A thermocouple assembly comprising a probe casing, a cover casing connected to said probe casing, a pair of electrically connected thermocouple wires disposed within said probe casing substantially throughout the length of the latter, a plurality of spaced studs mounted upon and including a portion extending within said cover casing, each of said stud portions being respectively connected to said thermocouple wires, means electrically insulating said studs from said cover casing, each stud including a supporting flange, a split sleeve mounted upon each of said stud supporting including flanges, said sleeve being longitudinally slotted throughout their length and adapted to be mounted upon said studs such that the slotted openings therein generally open toward each other, a lead wire connected to each of said sleeves, and a common connecting member adapted to clampingly retain said sleeves in electrical contact with said studs, said connecting member being electrically insulated from said sleeves and studs, said common connecting device comprising a pair of identically formed dish-shaped clamping members, said clamping members including arcuately formed sections corresponding in shape to that of said sleeves, said clamping members being disposed on opposite sides of said sleeves, and a stud fixed to one of said clamping members and adapted to extend through an aperture in the other of said clamping members, and means coacting with said stud to move said other clamping member toward said other clamping member to clampingly retain said sleeves upon said studs.

2. A thermocouple assembly as set forth in claim 1 in which the surface of each clamping member adapted to engage said sleeves includes an electrically insulating coating thereon.

References Cited in the file of this patent

UNITED STATES PATENTS

| | | |
|---|---|---|
| 1,869,151 | Jeffery et al. | July 26, 1932 |
| 2,025,363 | Taylor | Dec. 24, 1935 |
| 2,163,771 | Alden | June 27, 1939 |
| 2,483,898 | Goss | Oct. 4, 1949 |
| 2,698,352 | Fagg et al. | Dec. 28, 1954 |
| 2,745,898 | Hurd | May 15, 1956 |
| 2,795,770 | Toedtman | June 11, 1957 |

UNITED STATES PATENT OFFICE

CERTIFICATION OF CORRECTION

Patent No. 2,971,998                                February 14, 1961

James W. Thomas

It is hereby certified that error appears in the above numbered patent requiring correction and that the said Letters Patent should read as corrected below.

Column 3, line 23, strike out "including".

Signed and sealed this 1st day of August 1961.

(SEAL)
Attest:

ERNEST W. SWIDER
Attesting Officer

DAVID L. LADD
Commissioner of Patents